(12) United States Patent
Quant et al.

(10) Patent No.: US 10,948,364 B2
(45) Date of Patent: Mar. 16, 2021

(54) AIR AND GAS FLOW VELOCITY AND TEMPERATURE SENSOR PROBE

(71) Applicant: TSI, Incorporated, Shoreview, MN (US)

(72) Inventors: Frederick R. Quant, Shoreview, MN (US); Jugal Agarwal, Shoreview, MN (US); Siva Iyer, Plymouth, MN (US)

(73) Assignee: TSI, INCORPORATED, Shoreview, MN (US)

( * ) Notice: Subject to any disclaimer, the term of this patent is extended or adjusted under 35 U.S.C. 154(b) by 313 days.

(21) Appl. No.: 15/551,152

(22) PCT Filed: Feb. 15, 2016

(86) PCT No.: PCT/US2016/017930
§ 371 (c)(1),
(2) Date: Aug. 15, 2017

(87) PCT Pub. No.: WO2016/133834
PCT Pub. Date: Aug. 25, 2016

(65) Prior Publication Data
US 2018/0238746 A1 Aug. 23, 2018
US 2019/0234811 A9 Aug. 1, 2019

Related U.S. Application Data

(60) Provisional application No. 62/116,729, filed on Feb. 16, 2015.

(51) Int. Cl.
*G01K 13/02* (2006.01)
*G01P 5/12* (2006.01)
(Continued)

(52) U.S. Cl.
CPC ........... *G01K 13/02* (2013.01); *F01D 17/085* (2013.01); *G01K 1/14* (2013.01); *G01P 5/12* (2013.01); *G01K 2013/024* (2013.01)

(58) Field of Classification Search
CPC .... G01K 13/02; G01K 1/14; G01K 2013/024; G01P 5/12; F01D 17/085
See application file for complete search history.

(56) References Cited

U.S. PATENT DOCUMENTS 3,619,612 A * 11/1971 Belke ..................... G01K 1/024
250/349
4,982,605 A 1/1991 Oram et al.
(Continued)

FOREIGN PATENT DOCUMENTS

EP 0236922 A2 * 9/1987 ............... G01K 7/04
GB 2136579 A 9/1984
(Continued)

OTHER PUBLICATIONS

International Search Report and Written Opinion for International Application No. PCT/US2016/017930, dated Sep. 28, 2016 (18 pages).
(Continued)

*Primary Examiner* — Herbert K Roberts
*Assistant Examiner* — John M Royston
(74) *Attorney, Agent, or Firm* — Kagan Binder, PLLC

(57) ABSTRACT

There is disclosed a handheld air flow velocity measurement probe that includes a bridge circuit assembly having an airflow velocity sensor that is a resistance temperature detector (RTD) and a digitally controlled resistive element to dynamically adjust and maintain the resistance of the velocity sensor within the overheat temperature predefined range. The velocity measurement also uses a separate temperature sensor to sense the temperature of the air or gas flow. A humidity sensor is also included remote from the other sensors to measure humidity in the gas flow to be measured. All of the above described components are housed at a probe tip instead of a base as in most standard handheld probes and the digital interface at the probe tip allows the user to replace
(Continued)

a bulky, expensive telescoping antenna with stackable extender scheme.

20 Claims, 6 Drawing Sheets

(51) Int. Cl.
*F01D 17/08* (2006.01)
*G01K 1/14* (2006.01)

(56) References Cited

U.S. PATENT DOCUMENTS

| | | | |
|---|---|---|---|
| 5,069,066 | A | 12/1991 | Djorup |
| 5,162,725 | A | 11/1992 | Hodson et al. |
| 5,260,875 | A | 11/1993 | Tofte et al. |
| 6,134,958 | A | 10/2000 | Djorup |
| 6,543,282 | B1 | 4/2003 | Thompson |
| 6,694,799 | B2 | 2/2004 | Small |
| 6,705,158 | B1 | 3/2004 | Louden |
| 6,850,324 | B1 | 2/2005 | De Metz |
| 7,140,263 | B2 | 11/2006 | Beversdorf |
| 7,302,313 | B2 | 11/2007 | Sharp et al. |
| 7,305,327 | B2 | 12/2007 | Sper |
| 7,535,235 | B2 | 5/2009 | Molnar |
| 7,647,843 | B2 | 1/2010 | Burton |
| 7,788,294 | B2 | 8/2010 | Van Wert et al. |
| 9,069,002 | B2 | 6/2015 | Moro |
| 9,378,569 | B2 | 6/2016 | Yamane |
| 2004/0055374 | A1 | 3/2004 | Cohen et al. |
| 2006/0105467 | A1* | 5/2006 | Niksa ............... G01N 27/126 436/150 |
| 2008/0213372 | A1 | 9/2008 | Pastor et al. |
| 2009/0007706 | A1 | 1/2009 | Hilt et al. |
| 2009/0311951 | A1 | 12/2009 | Walkinshaw |
| 2014/0053586 | A1 | 2/2014 | Poecher et al. |
| 2014/0269812 | A1* | 9/2014 | Deutscher ............ G01K 15/005 374/1 |
| 2015/0192444 | A1* | 7/2015 | Olin ................... G01F 1/692 73/204.26 |

FOREIGN PATENT DOCUMENTS

| | | |
|---|---|---|
| WO | 2007/014400 A2 | 2/2007 |
| WO | 2012/054643 A1 | 4/2012 |

OTHER PUBLICATIONS

William Vanwart et al., "DirectSense Air—Air Velocity Meter (Anemometer)", Mar. 12, 2012, retrieved from the Internet: http://www.wolfsense.com/air-velocity-meter.html (3 pages).

"VelociCalc Air Velocity Meter TSI 9525", Oct. 7, 2008, retrieved from the Internet: http://www.eeprocess.com/STORE/item28.htm (2 pages).

"Air Velocity Sensor Array for Commercial Baking Ovens—Scorpion Reading Thermal—Reading Thermal", Jan. 12, 2015, retrieved from the Internet: http://www.readingthermal.com/equipment/air-velocity-sensor-array-commercial-baking-oven.html (2 pages).

\* cited by examiner

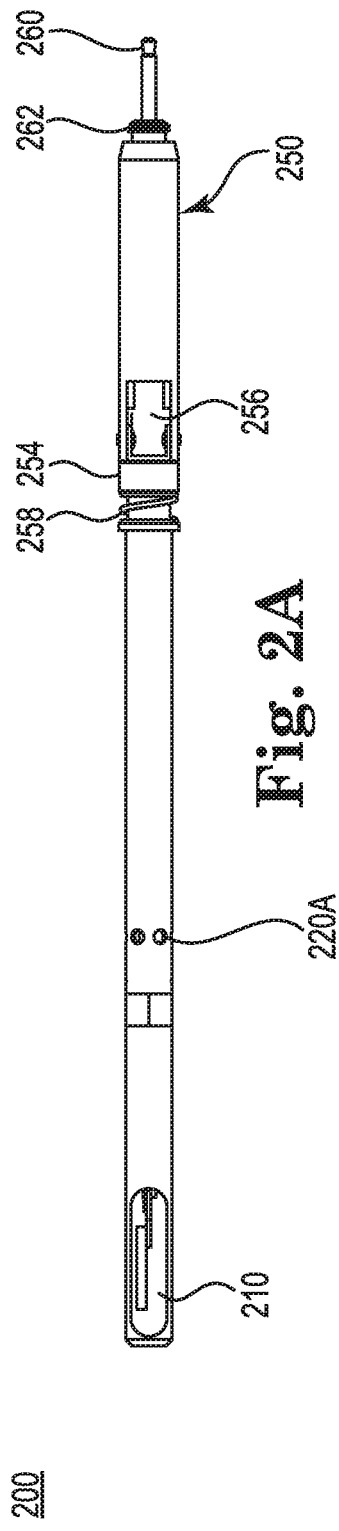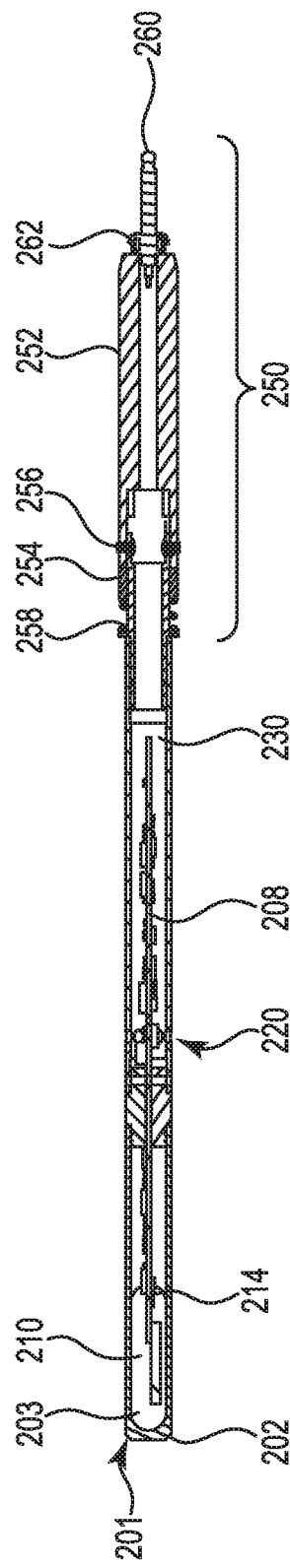

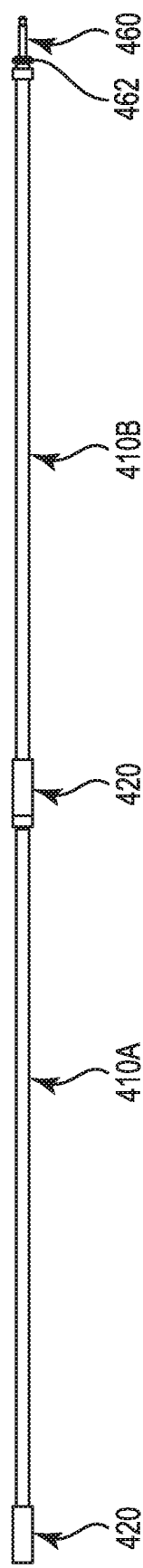
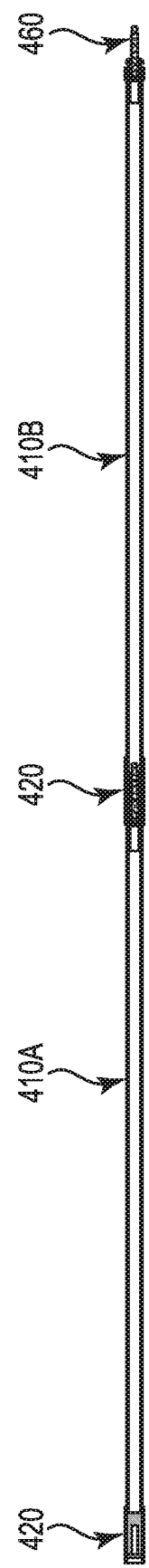

AIR AND GAS FLOW VELOCITY AND TEMPERATURE SENSOR PROBE

CLAIM OF PRIORITY

This application claims priority to, and the benefit of, U.S. Provisional Application No. 62/116,729, filed on Feb. 16, 2015 and is related to U.S. Publication 2014/0053586, both of which are incorporated herein by reference in their entireties.

FIELD AND BACKGROUND OF THE INVENTION

This invention relates generally to device and system for measuring the velocity, temperature and humidity of gas flow in a ventilation system or area.

There are numerous applications for air flow and ventilation monitors, such as work areas, spray booths, clean rooms, grinding operations, fume hoods and ventilation systems. Fume hoods serve to protect an operator from noxious fumes contained or generated within the fume hood. The fume hood has one or more openings in a face of the fume hood and the exhaust is preset to provide a desired flow velocity of air into the hood. To assure the safety of the operator, it is necessary to confirm that the required flow velocity is maintained.

Similarly, ventilation systems such as HVAC systems need to be checked and calibrated regularly, usually at certain points along the ductwork, to ensure that the airflow is at the appropriate velocity, temperature and humidity called for by the facility. For instance, the ventilation needs of a hospital are different than those of a construction site. Current air velocity sensors, such as TSI's Alnor® thermal anemometer, which incorporate a conventional Wheatstone bridge circuit, provides both high accuracy and minimal obstruction to the airflow.

The principle used requires that the flow sensor be heated to some temperature above the temperature of the fluid or gas being measured. Velocity of the fluid or gas is related to the power dissipation in the sensor. Very early implementations of thermal anemometers involved manual adjustment of the sensor temperature. The manual adjustments proved to be inconvenient and, as technology became available, were replaced by electronic control circuitry that automatically maintained the sensor at the specified temperature. A typical prior art airflow device includes a bridge circuit, an operational amplifier, and a power output amplifier. The bridge circuit comprises two circuit legs, with the first leg sensing the ambient temperature and including a resistive temperature detector (RTD) RD, an offset resistance RC, and a reference resistance RA. The second leg of the bridge circuit is the heated velocity sensor, comprising a second reference resistor RB and the heated RTD RE. The airflow device operates by applying a voltage to the bridge circuit sufficient to heat the velocity sensor (RE) to a temperature where its resistance will balance the bridge circuit. In this circuit, sensor measurement and temperature control occur simultaneously. Within this circuit, the resistive sensor RE behaves as a nonlinear passive element. The nonlinearity results from power dissipation in the sensor, which raises the sensor temperature and changes its resistance, thus making the resistance value dependent on the current through the sensor. Control of the sensor temperature takes advantage of this nonlinear behavior.

One limitation to this prior art approach is that the ambient temperature sensor should not be powered in any way that could cause self-heating, while the RTD (resistance temperature detector) used to sense the velocity must be heated sufficiently to sense airflow. Since these sensors are typically disposed in corresponding legs of a bridge network, only by making the ambient sensor resistance much larger than the velocity sensor resistance will self-heating be reduced sufficiently to prevent significant temperature errors. This limits the selection of sensors and often requires the use of more expensive custom RTDs rather than lower cost standard values used widely in the industry. Additionally, with a very low sensor resistance, sensitivity to temperature is proportionally lower, requiring measurement of signals near the threshold of system noise.

Another challenge in the constant use of these airflow meters for temperature and velocity measurement is the need to calibrate them after so many uses or after so much time has passed since the device's last calibration. In most cases the device needs to be sent back to the factory for calibration. The inconvenience and lost revenue for many customers experienced due to instrument calibration is a driving factor to find a solution to the calibration requirement. This impact to customers is even more severe in emerging countries like China where the return-to-factory delay may last weeks. Sending back sensor probes from the field for calibration results in downtime for the customer, which can be especially high if the customer location is either geographically far away from the service center of if there are customs or other procedures that result in delays.

SUMMARY OF THE INVENTION

Standard metrology instruments, such as air velocity instruments, are calibrated in the factory or field against a known calibration standard. The calibration values are then loaded directly into the instrument as part of the calibration process. There is therefore a commercial need to change the way that handheld air velocity instruments are calibrated, especially where many devices will be deployed and it may not be commercially feasible to return the devices to the factory at certain times for calibration. In one solution, the customer is sent a pre-calibrated sensor that they can easily install themselves in the field and thereby eliminate any instrument downtime. The customer may replace the probe tip and send the old one in to get calibrated at the factory. In another embodiment, all of the low cost digital components are located in a probe tip, thereby making it disposable, while the more expensive processing components along with the digital display are located in a handle. Calibration factors can then be stored in the memory in the probe tip and then updates can be provided in the processing programming of the handle so as to improve performance and add features (through firmware and by Bluetooth®).

This process also takes away the need to have dedicated memory hardware storing calibration data physically connected and shipped with the replacement sensor.

In one example embodiment, an anemometer is provided that houses a bridge circuit assembly including an airflow velocity sensor using a resistance temperature detector (RTD) to detect air flow velocity and a digitally controlled resistive element to dynamically adjust and maintain the resistance of the velocity sensor within an overheat temperature predefined range. The anemometer device also uses a separate temperature sensor to sense the temperature of the air or gas flow being measured. Data gathered from these devices serve as inputs into an analog to digital converter the output of which is processed by a controller in a probe handle. Also housed in the probe tip but distal to the air velocity sensor is a humidity sensor for measuring humidity in the gas flow. In one example embodiment, the humidity sensor is an integrated sensor with temperature and humidity measurement capabilities, which reduces cost and can improve accuracy of the overall air flow velocity measurements as humidity can be factored into the measurement calculation. Advantageously in one example embodiment, all of these components are housed at a probe tip instead of a base and a digital interface at the probe tip allows the user to replace a bulky, expensive telescoping antenna with a stackable extender scheme.

In this example embodiment, an air velocity sensor apparatus adapted to measure air and gas flow velocity and temperature includes a bridge circuit assembly including a bridge circuit coupled to an operational amplifier and a power output amplifier, the bridge circuit including a first leg with a heated velocity sensor and a first reference resistor, the velocity sensor being configured to operate within a predefined overheat temperature range which is above an ambient temperature. The bridge circuit has a second leg comprised of reference resistors and a digitally controlled resistive element to dynamically adjust and maintain the resistance of the velocity sensor within the overheat temperature predefined range, the operational amplifier applying a DC voltage to enable the velocity sensor to be heated to a target temperature within the overheat temperature range. The apparatus also includes a gas flow temperature sensor for measuring the temperature of the gas or air flow to be measured and an analog to digital converter coupled to an output of the temperature sensor and to an output of the bridge circuit assembly. In a related embodiment, the bridge circuit assembly, the digitally controlled resistive element and the temperature sensor are located in a probe housing, the probe housing having a window or opening at a probe tip that is adapted to expose the velocity sensor and the temperature sensor to an air and gas flow. In this example embodiment, the probe tip housing is adapted to couple to a probe handle including therein a controller, a memory unit and a display electrically coupled to the bridge circuit assembly for processing and storing data generated by the bridge circuit assembly and temperature sensor. In a related embodiment, the air velocity apparatus is part of a system that further includes a mobile or wireless software applet operating on a mobile communications device configured to communicate with the controller unit and memory in the probe handle.

In another example embodiment, the replaceable probe tips are extendible to various lengths depending on the application with the use of a plurality of probe extensions that are coupled end to end to achieve the desired length and configurable to have various lengths to enable air velocity measurements remote from a user of the velocity sensor assembly. The extended probe is then coupled to an anemometer based unit, either directly or wirelessly via RF or Bluetooth®. This approach is also adaptable to articulating probes having an angular range of between zero and 90 degrees (optionally up to 270 degrees), gooseneck-type extenders and cables that facilitate extension and movement of the probe in various angles in an airflow (or duct) to be measured.

In yet another example embodiment, an air velocity sensor assembly adapted to measure air and gas flow velocity and temperature includes an extension member having a proximal and a distal end, the extension member having an electrical coupling member disposed therein for coupling the probe tip located at the extension member proximal end to an electrical connector at the distal end of the extension member. In this example embodiment, a humidity sensor disposed within the probe tip housing and on a printed circuit board connecting the bridge circuit assembly and the temperature sensor outputs to the analog to digital converter. In another related embodiment, the air velocity sensor assembly is used to form an array of air velocity sensors configured for measurement of air flow patterns in an air duct, the array comprised of a plurality of air velocity apparatus connected in series with at least one coupling member interposed between each air velocity apparatus such that each probe opening is disposed in different parts of an air duct.

In a related embodiment, the air flow velocity sensor includes a flexible printed circuit board having the velocity sensor coupled at a distal end and the temperature sensor located thereon and away from the velocity sensor and having a proximal end of the flexible printed circuit board coupled to a connector in the probe housing, the flexible printed circuit board extending past the probe tip opening and bending back to expose the velocity sensor through the probe tip opening, thereby maximizing thermal isolation between the velocity sensor and the temperature sensor that are exposed to the air or gas flow through the probe tip opening.

In yet another example embodiment, a probe handle is provided that includes therein a controller, a memory unit and a display electrically coupled to a bridge circuit assembly for processing and storing data generated by a bridge circuit assembly, the probe handle further including a digital interface to enable a plurality of environmental sensors to be electrically connected to the probe handle components.

The above summary of the invention is not intended to describe each illustrated embodiment or every implementation of the invention. The figures and the detailed description that follow more particularly exemplify these embodiments.

BRIEF DESCRIPTION OF THE DRAWINGS

Other important objects and advantages of the invention will be apparent from the following detailed description of the invention taken in connection with the accompanying drawings in which:

FIGS. 2A-2C are partial front, side and full frontal views of a probe tip and articulating probe extension in accordance with the invention;

FIGS. 4A and 4B are front and full frontal views of a set of connected probe extension in accordance with the invention;

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
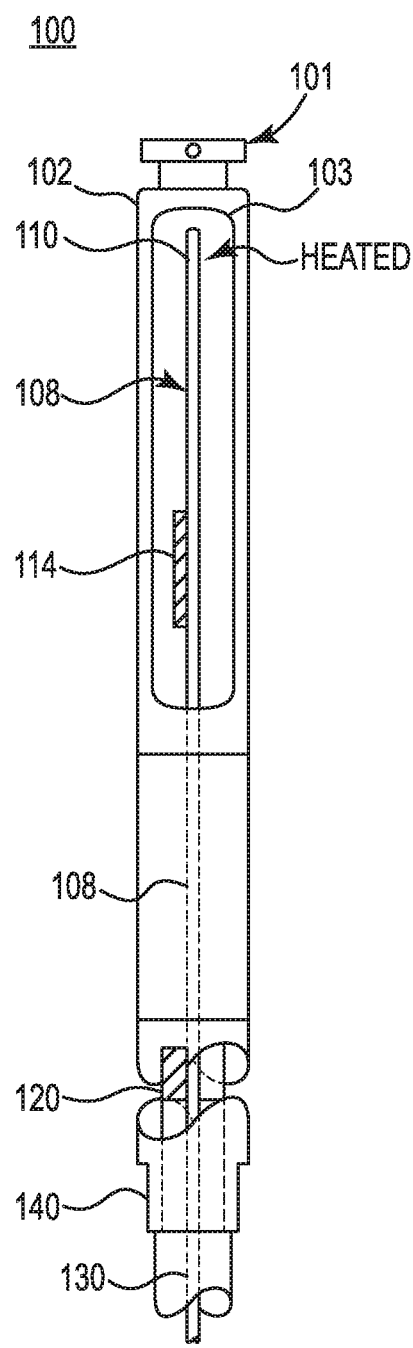
FIG. 1 is a cutaway view of a replaceable air velocity sensor probe tip in accordance with the invention.

Referring now to the Figures, in FIG. 1 is a cutaway view of a replaceable air velocity sensor probe 100 in accordance with the invention. In this example embodiment, all of the analog circuitry, including a Wheatstone-type bridge circuit, is moved from the base to the tip of a probe 101 to create a simple serial digital interface at tip 100 and a virtual bridge is applied to reduce volume. In this example embodiment, probe 100 includes a probe housing 102 with an opening or window 103 for exposing the sensor elements to an air or gas flow. Within probe housing 102 is a printed circuit board (PCB) 108 having disposed thereon an elongate RTD (resistance temperature detector) member 110 (typically platinum, serving as an air velocity sensor, which correlates changes in resistance with temperature changes. In this example embodiment, velocity sensor 110 has a resistance value of about 10 ohms and a length of about 6 mm. Disposed within housing 102 and adjacent to velocity sensor 110 is a temperature sensor 114 for measuring the temperature of the gas flow. Located remote from the probe tip opening is a humidity sensor 120 which is disposed on PCB 108 for measuring the humidity in the gas flow. PCB 108 is coupled at an opposite end to a connector assembly 130 that supports probe tip 100 on a probe handle (not shown) and serves as a digital interface with the probe handle. The digital interface at the tip allows us to replace a bulky, expensive telescoping antenna with stackable extender scheme.

In this example embodiment, sensor 120 in its package also includes temperature measuring capabilities using a silicon bandgap temperature sensor (thermometer) concept in which the forward voltage of a resistor is temperature-dependent. The bandgap voltage differences of two resistors at the same temperature help to determine the temperature. Sensor 120 also uses a pair of electrodes as a capacitor and uses the change in capacitance between the electrodes caused by the humidity in the air to determine the amount of humidity in the air flow. The humidity/temperature sensor in this example is a digital SHT 25 or 75 sensor made by Sensirion AG.

Referring now to FIGS. 2A-2C, there are illustrated partial front, side and full frontal views of a probe tip and articulating probe extension assembly 200 in accordance with the invention. Referring more specifically to FIG. 2C, the full frontal view of assembly 200 includes a probe 201 coupled to an articulating probe extension member 250, which provides the user the ability to place probe tip 201 in different positions within a duct or cavity in which air flow is being measured. In this example embodiment, probe 201 includes a housing 202 with a window 203 that exposes a velocity sensor 210 and a temperature sensor 214. Probe 201 includes a port 220A for humidity sensor 220 housed within housing 202. Sensor 220 is coupled to a PCB 208 which is coupled at the other end to a connector 230. In this example embodiment, probe extension 250 includes a housing 252, a coupling member 254, an articulating element 256 and a spring element 258 that works in combination with element 256 to move probe 201 at any angle between zero and ninety degrees, but in a related embodiment the range can also be 0-270 degrees. In this example embodiment, once assembled, probe tip and probe extension 200 are coupled to the handheld unit or probe handle (not shown) by way of a phonejack-type connector 260 and is screwed into place with threaded element 262. Other connector designs can be used and a threaded element can be substituted with a snap-fit or friction fit arrangement and are therefore not limited to the designs provided above. In related embodiment, an articulating extension member can also include a cable member and a goose neck type member. In yet another related embodiment, probe 201 is coupled wirelessly or communicates wirelessly with the handheld unit or probe handle.

Figure 3A:
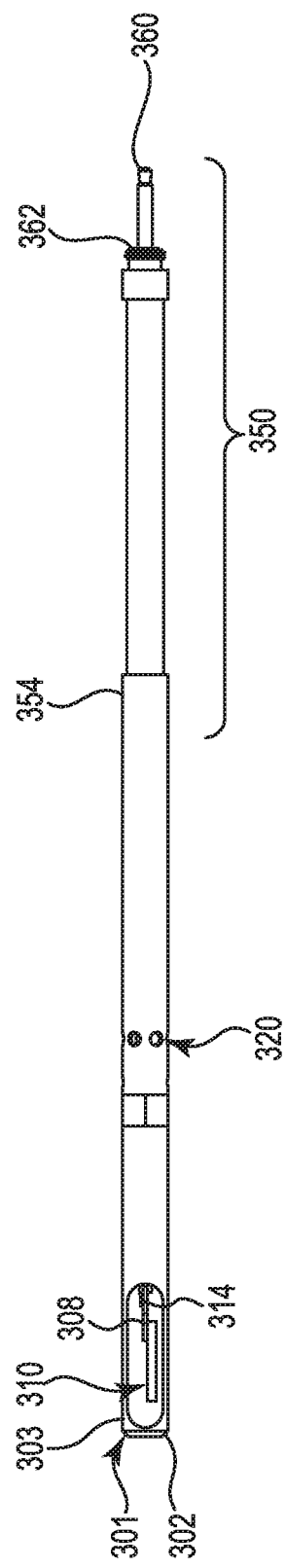
FIGS. 3A-3C are side, full frontal view and side views of a probe tip and a non-articulating probe extension in accordance with the invention.
Figure 3B:
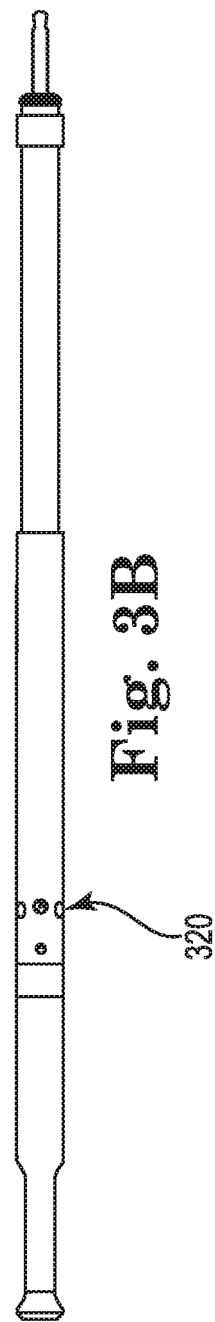
Figure 3C:
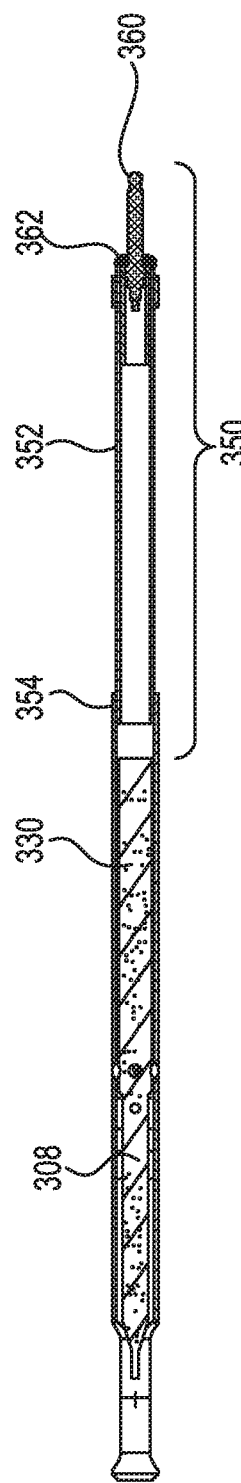

Referring now to FIGS. 3A-3C, there is illustrated side, full frontal view and side views of a probe tip and a non-articulating probe extension assembly 300 in accordance with the invention. Referring more specifically to FIG. 313, the full frontal view of assembly 300 includes a probe 301 coupled to a probe extension member 350, which provides the user the ability to place probe tip 301 in extend to various lengths within a duct or cavity in which air flow is being measured. In this example embodiment, probe 301 includes a housing 302 with a window 303 that exposes a velocity sensor 310 and a temperature sensor 314 disposed on a PCB 308. Probe 301 includes a port 320A for humidity sensor 320 (behind port 320A) housed within housing 302. Sensor 320 is coupled to a PCB 308 which is coupled at the other end to a connector 330. In this example embodiment, probe extension 350 includes a housing 352, a coupling member 354 and a connector member 360. Once assembled, probe tip and probe extension 300 are coupled to the handheld unit or probe handle (not shown) by way of the phonejack-type connector 360 and is screwed into place with threaded element 362. In a related embodiment, probe 301 is coupled wirelessly or communicates wirelessly with the handheld unit.

Referring now to FIGS. 4A and 4B, there is illustrated front and full frontal views of a set of connected probe extensions 400 in accordance with the invention. In this example embodiment, a set of probe extensions 410A and 410B are coupled together via a coupling member 420. In this example embodiment, each end of extensions 410A and 410B have a phonejack-type connector for connecting the probe extensions with each other and/or with a handheld unit used for data logging, power, control and other functions (not shown). The extensions include conductors within each to carry the signal from the probe tip to the handheld unit or probe handle once all of the probe extensions are electrically and manually coupled together. The end to end connection is not limited to phonejack-type connectors and other suitable connection schemes can be used. The connectors, in a related embodiment, are configurable with MEMS technology for use with multiple probes.

Figure 5:
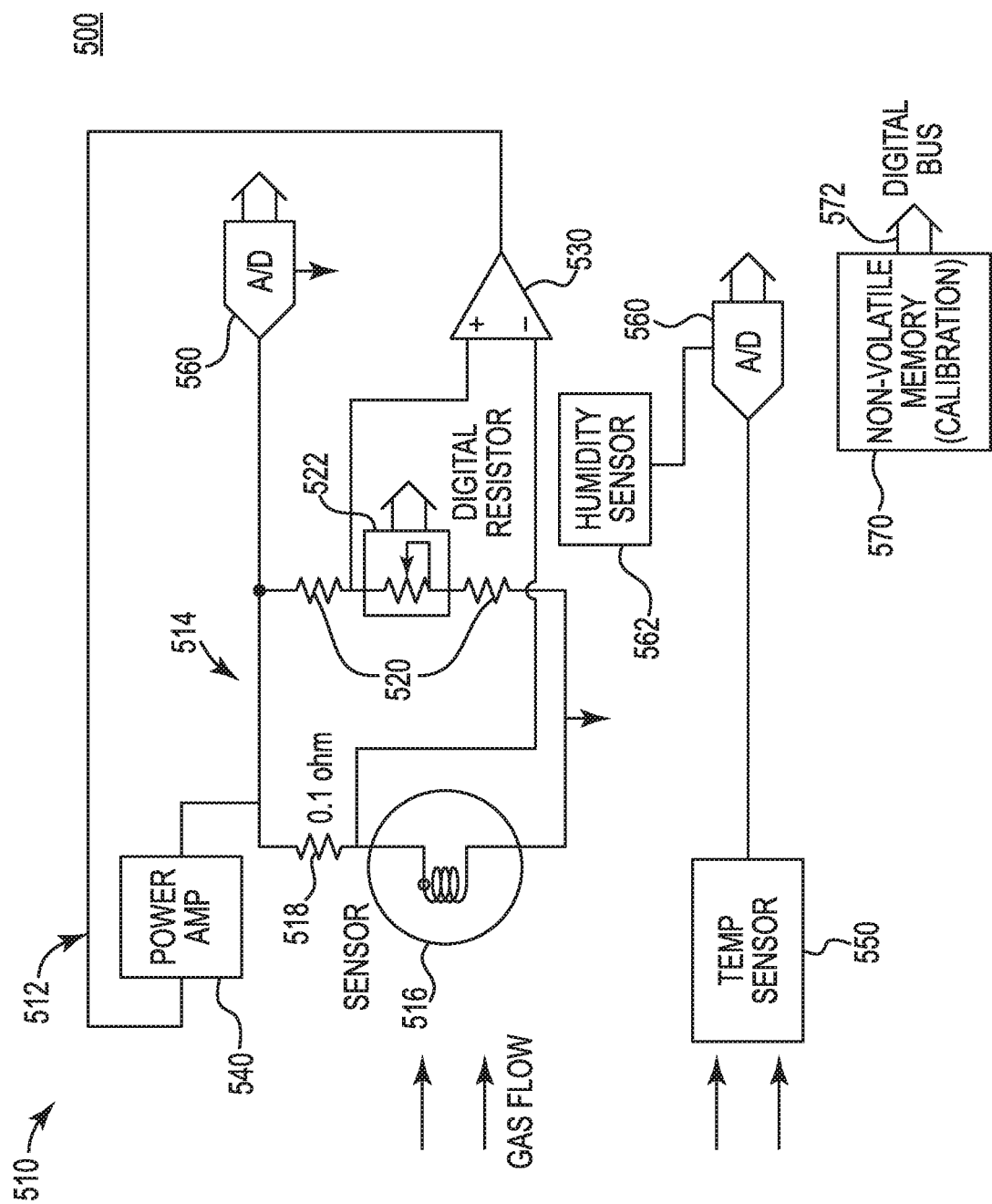
FIG. 5 is a schematic diagram of a bridge circuit and an airflow sensor probe assembly in accordance with the invention.

Referring now to FIG. 5 there is illustrated a schematic diagram of a measurement bridge circuit assembly 500 disposed within a probe tip (such as illustrated in FIG. 1) which is part of an airflow sensor probe assembly in accordance with the invention. The block diagram of FIG. 5 illustrates the main measurement bridge circuit 500, which includes an air velocity sensor apparatus 510 to measure air velocity and gas flow temperature of an air or gas flow in a particular duct or air way. Apparatus 510 also includes a bridge circuit assembly 512 including a bridge circuit 514 coupled to an operational amplifier 530 and a power output amplifier 540, the bridge circuit including a first leg with a heated velocity sensor 516 and a first reference resistor 518 (having a value of about 0.1 ohm), velocity sensor 516 operating within a predefined overheat temperature range which is above an ambient temperature (so as to run at a constant temperature). Bridge circuit 514 has a second leg comprised of reference resistors 520 and a digitally controlled resistive element 522 to dynamically adjust and maintain the resistance of velocity sensor 516 within the overheat temperature predefined range. In this example embodiment, a digital potentiometer is used for the digitally controlled resistive element 522, which can include anywhere from 64-1024 steps of adjustment. However, in another embodiment, a 2 pin rheostat device can also be used to provide the control and adjustment. When the overheat temperature of the resistance of velocity sensor 516 is below or outside the predefined temperature range, then operational amplifier 530 applies a DC voltage at the top of the bridge circuit to enable velocity sensor 516 to be heated to a target temperature within the overheat temperature range.

In this example embodiment, sensor device 510 also includes a gas flow temperature sensor 550 for measuring the temperature of the gas or air flow to be measured (gas flow arrows A). A change in bandgap voltage is used in this embodiment for the temperature sensor but the temperature sensor is not necessarily limited to this configuration. Sensor device 510 includes an analog to digital converter (ADC) 560A coupled to an output of temperature sensor 550 and to an output of the bridge circuit assembly at ADC 560 to provide for digital inputs for the remaining part of the sensor device. In a related embodiment, ADC 560 is connected to the output of bridge 514 includes temperature sensor 550 therein, thereby reducing component count in sensor device 510. Non-volatile memory 570 is also included for data storage and calibration the sensor probe with a connection to a driver bus 572. In this example embodiment, in order to enhance the determination of temperature within the sensor apparatus (without interference with additional heat sources) as the velocity sensor is exposed to an airflow to be measured, power output amplifier 540 of bridge circuit assembly 512 operates in a range less than about 900 microwatts.

In a related embodiment, the bridge circuit assembly, the digitally controlled resistive element and the temperature sensor are located in a probe housing, the probe housing having a window or opening at a probe tip to expose the velocity sensor and the temperature sensor to an air and/or gas flow. An advantage to this design is that the majority of the sensing components (and those digital components that exhibit little or no drift in performance) have been moved to the probe tip and away from the base, thereby simplifying the use of probe extensions to reach various places in HVAC systems. In this example embodiment, the probe tip housing is coupled to a probe handle including therein a controller (such as a microprocessor), a memory unit and a display electrically coupled to the bridge circuit assembly for processing and storing data generated by the bridge circuit assembly and temperature sensor. In a related embodiment, the air velocity apparatus is part of a system that further includes a mobile or wireless (RF or Bluetooth®) software applet operating on a mobile communications device configured to communicate with the controller unit and memory in the probe handle.

Figure 6A:
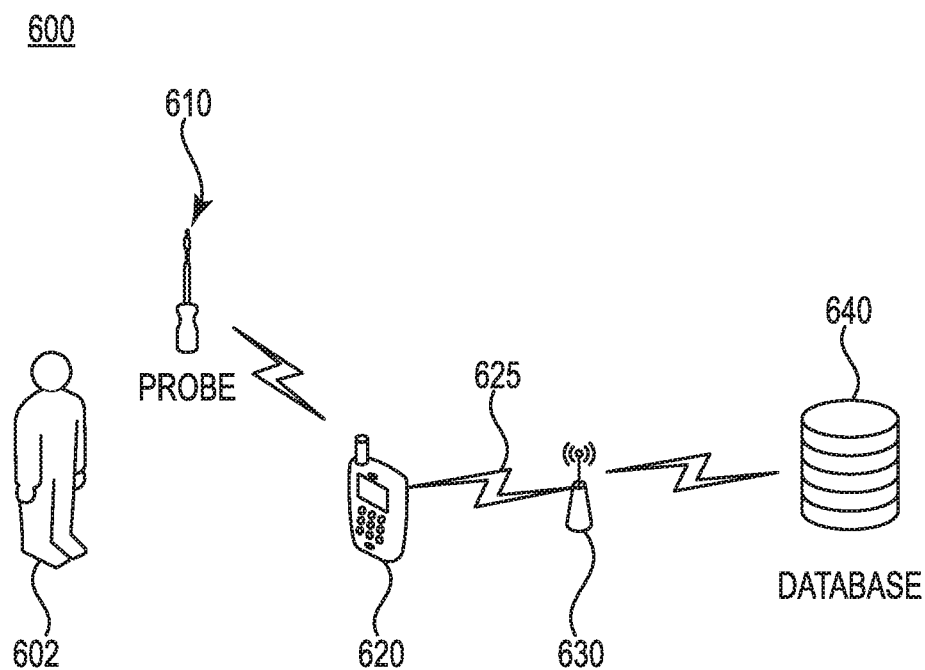
FIGS. 6A and 6B are a process flow diagram of system for remote calibration of handheld airflow sensor probes and another example sensor probe configuration, respectively, in accordance with the invention.
Figure 6B:
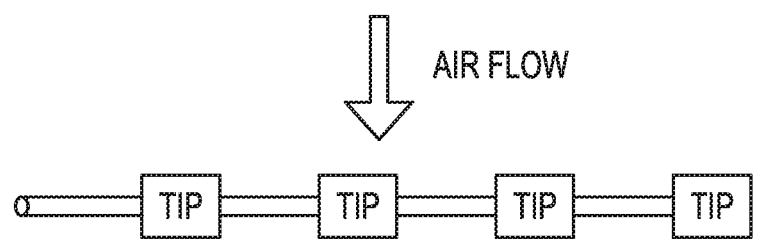

Referring now to FIGS. 6A and 6B are a process flow diagram of system 600 for remote calibration of handheld airflow sensor probes and another example sensor probe, respectively, in accordance with the invention. In this example embodiment, user 602 uses a handheld sensor probe 610 with a probe sensor tip 612 for performing various airflow measurements that are communicated wirelessly 615 (RF or Bluetooth®) to a handheld measurement device 620. In a related embodiment, probe 610 is tethered directly to handheld device 620. Handheld device 620, in one example embodiment, is a smartphone or smart device that includes a software applet for processing the data received from probe 610. Handheld device 620 is configured to communicate wirelessly 625 via a network and communications system 630 (private or public (internet)), which in turn facilitates communication 635 to a database 640 that stores specifications and data needed for system 600. Handheld sensor probe 610 can be any of the sensor probe configurations described herein.

In this example embodiment, system 600 supports a method to remotely load calibration data (either original or previous calibrations) for probe tip sensors 612 that are normally calibrated to a reference standard in a lab using a unique id and the remote connection to database 640 through network 630. Probes 610 or probe tips 612 or instruments 620 can be sold or leased to users with a removable "probe tip" 612 (such as also described earlier in this specification) containing a sensor and a serial number associated with the sensor. The serial number can be communicated to the user in a variety of ways. Users can purchase a calibrated "probe tip" for replacement in the field. This tip can replace the one that is on their probe/instrument. They can then connect their probe 610 (or instrument) to a device 620 that is connected to internet/network 630 and has a customized software application already loaded on it. This customized application can communicate through the internet with a database that ties the purchased probe tip to its calibration data and then downloads this calibration data onto the device. In a related example embodiment, device 620 can apply the calibration data to the measurements taken by installed probe tip 612 and ensure that the readings obtained are within a reference specification where the user is set up for this type of calibration and has a fume hood or wind tunnel.

Referring to FIG. 6B and to FIG. 1, sensor probe tip 100 is configurable to provide a platform that supports arrayed sensors (e.g., 5-7 sensors). Although sensor tip 100 is illustrated with a connection point at the bottom, it is configurable with connection points at either for both ends. As illustrated in FIG. 6B, this allows "stacking" multiple sensors tips, such as sensor tip 100A, to simultaneously read several points in the flow stream, designated by arrow A. Any combination of sensors can be used and are not limited to the 4 sensor tips illustrated. This approach is useful for fume hood and duct traverse measurements.

In a related embodiment, interchangeable sensors (and sensor tips) are used and the probe handle is able to house components for wireless communication with the probes and the handheld device. The software applet facilitates the data logging, Set-up and application/workflows functions as well. In yet other related embodiments, differential pressure or other gas ($CO_2$ or $O_2$) sensors (but not limited to same) are configurable with a removeable or field replaceable probe and do to the fact that most of the components are digital you will have no degradation in the signal when the probe extensions are put on. In some examples, the extensions can reach 5 feet or more in length (current analog is in the range of 18-32 inches).

In another related embodiment, small sensor probe tip 100, as shown in FIG. 1, and wireless connectivity also provides a platform for installed sensors in ductwork. Coupling such compact airflow sensors with a field calibratable particle sensor could enable dynamic HVAC control to achieve the optimum balance of energy savings and comfort. In this example embodiment, the field calibratable particle sensor incorporates a compact piezoelectric microblower and filter material to periodically pass filtered air through a photometric sensor to provide more accurate low-concentration measurements. In this example embodiment, the piezoelectric microblower has an advantage over other air movers in that it can provide enough pressure head across a filter to drive a significant flow (about 11 µm) to provide clean air to a dust or particle sensor component in a very small package.

In yet another related embodiment, incorporating smartphones for the handheld device, as in system 600, provides new functionality currently too expensive in proprietary designs. For example, capturing GPS coordinates with the desired parameter (velocity, temperature, etc.) measurement allows for geospatial data visualization and rapid report generation. Smartphone displays can also be mirrored on PC's to allow for remote display and control. Voice recognition and text-to-speech allows for hands-free command and control.

The following patents and publications are incorporated by reference in their entireties: U.S. Pat. Nos. 6,705,158; 7,305,327; 7,788,294 and U.S. Publication 20140053586.

The foregoing specific embodiments of the present invention as set forth in the specification herein are for illustrative purposes only. Various deviations and modifications may be made within the spirit and scope of the invention without departing from the main theme thereof.

What is claimed is:

1. An air velocity sensor apparatus adapted to measure air and gas flow velocity and temperature comprising:
   a bridge circuit assembly including a bridge circuit coupled to an operational amplifier and a power output amplifier, the bridge circuit including a first leg with a heated velocity sensor and a first reference resistor, the velocity sensor configured to operate within a predefined overheat temperature range which is above an ambient temperature, the bridge circuit having a second leg comprised of reference resistors and a digitally controlled resistive element to dynamically adjust and maintain the resistance of the velocity sensor within the overheat temperature predefined range, the operational amplifier applying a DC voltage to enable the velocity sensor to be heated to a target temperature within the overheat temperature range;
   a gas flow temperature sensor for measuring the temperature of the gas or air flow to be measured; and
   an analog to digital converter coupled to an output of the temperature sensor and to an output of the bridge circuit assembly
   wherein the bridge circuit assembly, the gas flow temperature sensor and analog to digital converter are located in a probe tip housing, the probe tip housing having a window or opening that is adapted to expose the velocity sensor and the temperature sensor to an air and gas flow.

2. The air velocity sensor apparatus of claim 1, wherein the power output amplifier of the bridge circuit assembly operates in a range less than about 900 microwatts, thereby enhancing the determination of temperature within the sensor apparatus as the velocity sensor is exposed to an airflow to be measured.

3. The air velocity sensor apparatus of claim 1, further comprising a humidity sensor located away from the velocity sensor and exposed to the same air flow as the velocity and temperature sensors, thereby increasing the accuracy of air velocity measurements by factoring in humidity levels in air flow.

4. The air velocity sensor apparatus of claim 1, wherein a second temperature sensor and humidity sensor are provided in a single device to enhance the ability to make a humidity measurement which is very sensitive to temperature.

5. The air velocity sensor apparatus of claim 1, further comprising a flexible printed circuit board having the velocity sensor coupled at a distal end and the temperature sensor located thereon and away from the velocity sensor and having a proximal end of the flexible printed circuit board coupled to a connector in the probe tip housing, the flexible printed circuit board extending past the probe tip opening to expose the velocity sensor through the probe tip opening.

6. The air velocity sensor apparatus of claim 1, wherein the probe tip housing is adapted to couple to a probe handle including therein a controller, a memory unit and a display electrically coupled to the bridge circuit assembly for processing and storing data generated by the bridge circuit assembly and temperature sensor.

7. The air velocity sensor apparatus of claim 6, wherein the probe handle further comprises an RF communications module for wireless communication with a base unit.

8. A data collection system including the velocity sensor, probe tip and probe handle of claim 7, further comprising a mobile or wireless software applet operating on a mobile communications device configured to communicate with the controller unit and memory in the probe handle.

9. An array of air velocity sensor apparatus of claim 1 configured for measurement of air flow patterns in an air duct, the array comprised of a plurality of air velocity apparatus connected in series with at least one coupling member interposed between each air velocity apparatus such that each probe opening is disposed in different parts of an air duct.

10. The air velocity sensor apparatus of claim 1 additionally comprising a non-volatile memory unit containing calibration data located in the probe tip housing.

11. The air velocity sensor apparatus of claim 1 wherein the probe tip housing is comprised in a removable probe tip.

12. The air velocity sensor assembly of claim 6 wherein the probe tip housing is comprised in a removable probe tip.

13. An air velocity sensor assembly adapted to measure air and gas flow velocity and temperature comprising:
   a probe tip housing having an opening therein;
   a bridge circuit assembly disposed within the probe tip housing and including a bridge circuit coupled to an operational amplifier and a power output amplifier, the bridge circuit including a first leg with a heated velocity sensor and a first reference resistor, the velocity sensor configured to operate within a predefined overheat temperature range which is above an ambient temperature, the bridge circuit having a second leg comprised of reference resistors and a digitally controlled resistive element disposed within the probe tip housing and adapted to dynamically adjust and maintain the resistance of the velocity sensor within the overheat temperature predefined range, the operational amplifier applying a DC voltage to enable the velocity sensor to be heated to a target temperature within the overheat temperature range;
   a gas flow temperature sensor disposed within the probe tip housing for measuring the temperature of the gas or air flow to be measured;
   an analog to digital converter disposed within the probe tip housing and coupled to an output of the temperature sensor and to an output of the bridge circuit assembly; and
   an extension member having a proximal and a distal end, the extension member having an electrical coupling member disposed therein for coupling the probe tip housing located at the extension member proximal end to an electrical connector at the distal end of the extension member.

14. The air velocity sensor assembly of claim 13, further comprising a humidity sensor disposed within the probe tip housing and on a printed circuit board connecting the bridge circuit assembly and the temperature sensor outputs to the analog to digital converter.

15. The air velocity sensor assembly of claim 13, wherein the extension member is selected from a group consisting of an articulating probe member having an angular range of between zero and at least 90, a cable member, and a goose neck type member.

16. The air velocity sensor assembly of claim 13, further comprising a plurality of extension members coupleable in series and configurable to have various lengths to enable air velocity measurements remote from a user of the velocity sensor assembly.

17. An array of air velocity sensor apparatus of claim 13, configured for measurement of air flow patterns in an air duct, the array comprised of a plurality of air velocity apparatus connected in series with at least one coupling member interposed between each air velocity apparatus such that each probe opening is disposed in different parts of an air duct.

18. The air velocity sensor assembly of claim 13, wherein the probe tip housing is adapted to couple to a probe handle including therein a controller, a memory unit and a display electrically coupled to the bridge circuit assembly for processing and storing data generated by the bridge circuit assembly.

19. The air velocity sensor assembly of claim 13 additionally comprising a non-volatile memory unit containing calibration data located in the probe tip housing.

20. The air velocity sensor assembly of claim 13 wherein the probe tip housing is comprised in a removable probe tip.

* * * * *